United States Patent
Jang et al.

(10) Patent No.: US 9,967,023 B2
(45) Date of Patent: May 8, 2018

(54) METHOD AND APPARATUS FOR TRANSMITTING AND RECEIVING A SIGNAL OF A TERMINAL IN A TIME DIVISION WIRELESS COMMUNICATION SYSTEM

(75) Inventors: Jae Hyuk Jang, Suwon-si (KR); Soeng Hun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 161 days.

(21) Appl. No.: 14/128,798

(22) PCT Filed: Aug. 10, 2012

(86) PCT No.: PCT/KR2012/006391
§ 371 (c)(1),
(2), (4) Date: Dec. 23, 2013

(87) PCT Pub. No.: WO2013/025016
PCT Pub. Date: Feb. 21, 2013

(65) Prior Publication Data
US 2014/0153450 A1  Jun. 5, 2014

(30) Foreign Application Priority Data
Aug. 12, 2011 (KR) .................. 10-2011-0080865

(51) Int. Cl.
*H04B 7/26* (2006.01)
*H04L 5/00* (2006.01)
*H04L 1/18* (2006.01)

(52) U.S. Cl.
CPC ......... *H04B 7/2643* (2013.01); *H04B 7/2656* (2013.01); *H04L 1/1854* (2013.01); *H04L 1/1861* (2013.01); *H04L 5/0053* (2013.01)

(58) Field of Classification Search
None
See application file for complete search history.

(56) References Cited

U.S. PATENT DOCUMENTS

2009/0241004 A1  9/2009  Ahn et al.
2009/0257408 A1  10/2009  Zhang et al.
(Continued)

FOREIGN PATENT DOCUMENTS

EP        2 104 263 A1    9/2009
KR    10-2011-0050682 A   5/2011
(Continued)

OTHER PUBLICATIONS

Motorola, UL bundling for TDD, 3GPP TSG RAN1 #53Bis, Jun. 30, 2008-Jul. 4, 2008, Warsaw, Poland, R1-082334.
(Continued)

*Primary Examiner* — Hicham Foud
(74) *Attorney, Agent, or Firm* — Jefferson IP Law, LLP

(57) ABSTRACT

A method of transmitting data for uplink coverage for improvement of a wireless communication system by a terminal improving uplink data transmission reliability so as to be capable of successful data transmission. A method for transmitting and receiving a signal of a terminal in a time division wireless communication system of the present invention includes receiving a TTI bundling setting command from a base station, confirming whether a TTI bundling number is included in the TTI bundling setting command, determining the time when a signal is transmitted and received according to the TTI bundling number, when the TTI bundling number is included and determining the time when a signal is transmitted and received according to a preset TTI bundling number, when the TTI bundling number is not included.

10 Claims, 3 Drawing Sheets

(56) References Cited

U.S. PATENT DOCUMENTS

| | | | |
|---|---|---|---|
| 2009/0268707 A1* | 10/2009 | Pani | H04L 1/18 370/345 |
| 2010/0067412 A1* | 3/2010 | Kitazoe | H04L 1/1812 370/294 |
| 2010/0111068 A1* | 5/2010 | Wu | H04L 1/1812 370/345 |
| 2010/0192035 A1* | 7/2010 | Sagfors et al. | 714/748 |
| 2010/0278064 A1* | 11/2010 | Jeong | H04L 43/0829 370/252 |
| 2011/0141952 A1* | 6/2011 | Wang | H04L 1/1812 370/294 |
| 2012/0099526 A1* | 4/2012 | Murase | H04L 1/0045 370/328 |
| 2012/0320842 A1* | 12/2012 | Jeong | H04W 74/006 370/329 |
| 2014/0056237 A1 | 2/2014 | Eriksson et al. | |

FOREIGN PATENT DOCUMENTS

| | | |
|---|---|---|
| WO | 2010-006008 A1 | 1/2010 |
| WO | 2010-022070 A1 | 2/2010 |
| WO | 2010-129822 A1 | 11/2010 |
| WO | 2013/169164 A1 | 11/2013 |

OTHER PUBLICATIONS

Nokia, Nokia Siemens Networks, Consideration on TTI Bundling for LTE TDD, 3GPP TSG-RAN WG1 Meeting #53bis, Jul. 4, 2008, Warsaw, Poland, R1-082585.

* cited by examiner

METHOD AND APPARATUS FOR TRANSMITTING AND RECEIVING A SIGNAL OF A TERMINAL IN A TIME DIVISION WIRELESS COMMUNICATION SYSTEM

TECHNICAL FIELD

The present invention relates to a wireless communication system and, in particular, to an uplink data transmission method of a terminal.

BACKGROUND ART

Mobile communication systems developed to provide the subscribers with voice communication services on the move. With the rapid advance of technologies, the mobile communication systems have evolved to support high speed data communication services as well as the standard voice communication services. However, the limited resource and user requirements for higher speed services in the current mobile communication system spur the evolution to more advanced mobile communication systems.

As one of the next generation mobile communication system to meet such requirements, the $3^{rd}$ Generation Partnership Project (3GPP) has standardized Long Term Evolution (LTE) and LTE-Advanced (LTE-A). LTE is a technology designed to provide high speed packet-based communication of up to 100 Mbps. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, if a transmission range (hereinafter, referred to as coverage) increases, it is possible to reduce performance degradation of a terminal at the cell boundary as well as reduce a number of base stations to be deployed. Particularly, since the transmit power of the terminal is more constrained than that of the base station, improvement of uplink coverage is important.

There is therefore a need of researches for increasing uplink coverage.

DISCLOSURE OF INVENTION

Technical Problem

The present invention has been made in an effort to solve the above problem and aims to provide a method of applying Transmission Timing Interval (TTI) bundling function to the various configurations in a Time Division Duplex (TDD) wireless mobile communication system.

Solution to Problem

First means to solve the problem is a method for adjusting a number of subframes for data transmission in TTI bundling in such a way of configuring the number of subframes to be bundled variably and transmitting the configuration value from the cell to the terminal through higher layer signaling (e.g. RRC signaling).

Second means to solve the problem is a method for adjusting uplink data transmission timing and ACK/NACK transmission timing corresponding to the data according to the configuration number while using a fixed number of subframes to be bundled as in the conventional method.

Also, since the TTI bundling is applied when the terminal located at the cell edge experiences significant signal degradation, the TTI bundling is applied after releasing Carrier Aggregation (CA).

Advantageous Effects of Invention

Using the proposed method, the terminal is capable of applying TTI bundling to various TDD uplink/downlink configurations so as to improve uplink data transmission coverage.

MODE FOR THE INVENTION

Figure 1:
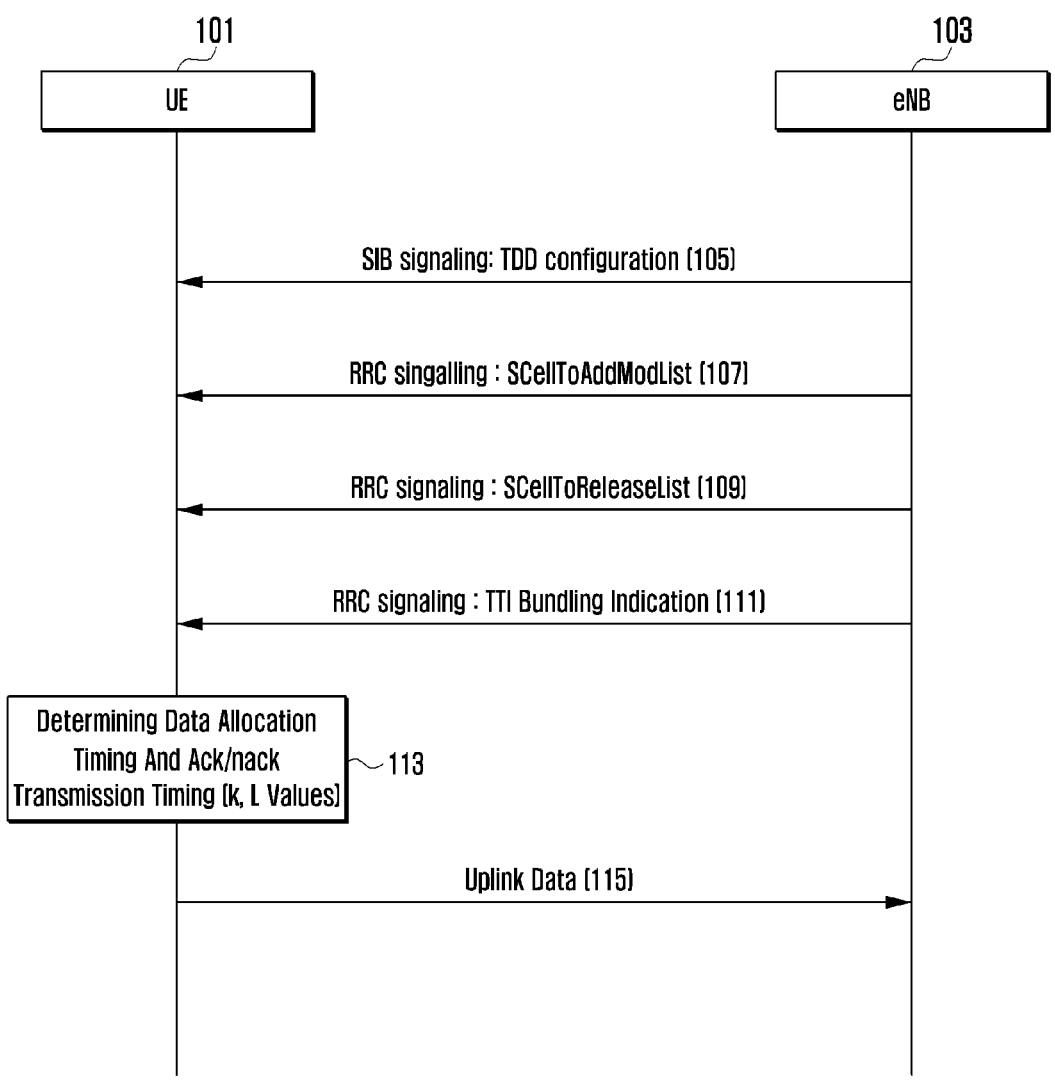
FIG. 1 is a signal flow diagram illustrating message transmission/reception procedure according to an embodiment of the present invention.

Although the embodiments of the present invention are directed to Advanced E-UTRA (or LTE-A) standard supporting carrier aggregation, it will be understood by those skilled in the art that the present invention can be applied even to other communication systems having the similar technical background and channel format, with a slight modification, without departing from the spirit and scope of the present invention. For example, the subject matter of the present invention can be applied to multicarrier HSPA supporting carrier aggregation.

In the LTE system as one of the next generation wireless communication system, Transmission Time Interval (TTI: smallest unit of time for scheduling in LTE) bundling technique is used to improve uplink coverage. TTI bundling is a technique to transmit different Redundancy Vectors (RVs) of same data using 4 consecutive TTIs. In an exemplary case of Frequency Division Duplexing (FDD) LTE system, if the cell allocates uplink resource at Nth frame, the terminal transmits different RVs at $(N+4)^{th}$, $(N+5)^{th}$, $(N+6)^{th}$, and $(N+7)^{th}$ frames, and the cell which receives the four different RBs of the same data sends back acknowledgement at the $(N+1)^{th}$ frame.

Meanwhile, the LTE TDD system uses a transmission method different from the above-described method. This is because the uplink and downlink transmissions are separated in time domain and change in position depending on the TDD configuration. Table 1 shows uplink and downlink positions according to TDD configuration in the LTE TDD system.

TABLE 1

| Configuration | Switching point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in table 1, there are 7 TDD configurations, and each subframe spans 1 ms long and equal to TTI. In configuration 0 of table 1, the $0^{th}$ and $5^{th}$ subframes are downlink subframes (indicated by "D"), the $1^{st}$ and $6^{th}$ subframes are special subframes switchable between downlink and uplink, and the $2^{nd}$, $3^{rd}$, $4^{th}$, $7^{th}$, $8^{th}$ and $9^{th}$ subframes are uplink subframes (indicated by "U"). As shown in the table, the configurations 0, 1, and 6 have uplink subframes large enough in number for TTI bundling operation as defined in the current specification with the exception of other configurations.

In order to secure wider uplink coverage in TDD system, it is necessary to increases the number of configurations capable of supporting TTI bundling in addition to configurations 0, 1, and 6. Meanwhile, since each of configurations 2, 3, and 4 has multiple uplink durations in one frame of 10 ms period, there is a room for applying TTI bundling.

The present invention has been made in an effort to solve the above problem and aims to applying TTI bundling to various TDD uplink/downlink configurations in a TDD wireless mobile communication system.

FIG. 1 is a signal flow diagram illustrating message transmission/reception procedure according to an embodiment of the present invention.

The UE 101 receives information on current duplex mode of the current system and, if TDD, the TDD uplink/downlink configuration number from the cell 103 at step 105. The cell 103 sends the UE 101 the information on whether to apply Carrier Aggregation (CA) and, if applies CA, the cell-to-add information through high layer signaling (in the invention, Radio Resource Control (RRC) layer message) at step 107. Afterward, if it is determined to apply TTI bundling to the UE 101, the cell 103 checks whether CA is applied and, if so, commands to release CA at step 109. This is because the CA which aggregates multiple carriers to increase data rate increases data error occurrence rate at the cell edge UE.

Afterward, the cell 103 informs the corresponding UE 101 whether to apply TTI bundling at step 111. For reference, if a control message instructing to apply TTI bundling is received in the state that CA is applied, the UE 101 determines it as occurrence of error and thus performs RRC CONNECTION REESTABLISHMENT.

At this time (when notifying whether TTI bundling is applied), a few embodiments are possible.

In the first embodiment in which the cell 103 informs the UE 101 whether to configure TTI bundling, the cell 103 gives the UE 101 the indication informing whether to configure TTI bundling such that the UE 101 determines a number of subframes for use in TTI bundling according to the TDD configuration. For example, the number of subframes for TTI bundling is set to 4 for the cell using one of configurations 0, 1, and 6, 3 for the cell using the configuration 3, and 2 for the cell using one of configurations 2 and 4. In the case of using one of the configurations 0, 1, and 6, there are uplink subframes large enough in number in the frame (i.e. configurations 0, 1, and 6 have 6, 4, and 6 uplink subframes, respectively), it is possible to use four subframes for TTI bundling like TTI bundling in FDD, resulting in increase of uplink data transmission success probability.

In the case of configuration 3 which has only three uplink subframes in one frame, if 4 subframes are used as in the FDD TTI bundling, the transmission has to be made across two frames and this elongates the data transmission time and, when retransmission is required, delays the retransmission timing, resulting in increase of entire data transmission time. Likewise, in the case of configuration 2 or 4 which has only two uplink subframes in one frame, it is necessary to adjust the number of subframes for use in TTI bundling in order to prevent increase of data transmission delay.

In the second embodiment in which the cell 103 informs the UE 101 whether to configure TTI bundling, the cell sends the UE 101 a message including the information on the number of subframes for use in TTI bundling as well as whether to configure TTI bundling. For example, if it is intended to configure TTI bundling to the UE 101, the cell 103 may send the UE 101 the information on whether to configure TTI bundling and the number of subframes for use in TTI bundling (e.g. 4, 3, or 2).

In the above two embodiments, if three subframes are used for TTI bundling in configuration 3, it is proposed to use the resource allocation timing value (I value) for retransmission as shown in table 2.

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | | 2 | | 3 | | 2 | | | 3 |
| 3 | | 1 | | | | | | | 8 | 1 |
| 6 | | 5 | 5 | | | | 6 | 6 | | 8 |

A description is made of the method of using I value under the assumption that the initial resource allocation is transmitted at subframe 8. If uplink resource allocation is made at the $N^{th}$ subframe (i.e. subframe 8), the UE transmits different RVs at $(N+4)^{th}$, $(N+5)^{th}$, and $(N+6)^{th}$ subframes consecutively.

If the RVs are received, the cell transmits ACK/NACK at $(N+12)^{th}$ subframe (i.e. subframe 0 of the frame after next since the initial allocation), and this subframe is in frame n-I. If dynamic retransmission is required, the corresponding resource allocation is transmitted in the frame n and, since the n-I is equal to n in the table proposed in the present invention only when the subframe 8 is in the frame n, such that I is 8 and thus the resource allocation for retransmission is made in frame N+20 (i.e. subframe 8 in the frame after next since the initial allocation). In retransmission, the UE retransmits the data at $(N+24)^{th}$, $(N+25)^{th}$, and $(N+26)^{th}$ subframes, and the HARQ retransmission period is 20 ms. Accordingly, if I value of table is used in configuration 3, the UE is capable of operating two HARQ processes while using relatively short HARQ retransmission period of 20 ms.

In the third embodiment in which the cell 103 informs the UE 101 whether to configure TTI bundling, a number of subframes TTI bundling are fixed such that the cell 103 notifies the UE 101 only whether to configure TTI bundling. In this case, since the current standard defines the ACK/NACK transmission timing for configurations 0, 1, and 6, there is a need of defining ACK/NACK transmission timing for configuration 3 newly and the present invention proposes values of table 3 as follows.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | | 2 | | 3 | | | 2 | | 3 |
| 3 | | 2 | | | | | | | 9 | 9 |
| 6 | | 5 | 5 | | | | 6 | 6 | | 8 |

A description is made of the method of using I value under the assumption that the initial resource allocation is transmitted at subframe 8. If uplink resource allocation is made at the $N^{th}$ subframe (i.e. subframe 8), the UE transmits different RVs at $(N+4)^{th}$, $(N+5)^{th}$, $(N+6)^{th}$, and $(N+14)^{th}$ subframes (i.e. subframes 2, 3, and 4 of the next frame and subframe 2 of the frame after next since the initial allocation). If the RVs are received, the cell transmits ACK/NACK at $(N+20)^{th}$ subframe (i.e. subframe 8 of the frame after next since the initial allocation), and this subframe is in frame n-I. If dynamic retransmission is required, the dynamic resource allocation is transmitted in frame n and, since the n-I is equal to n in the table proposed in the present invention only when the subframe 0 is in the frame n, such that I is 2 and thus the resource allocation for retransmission is made in frame N+22 (i.e. subframe 0 in the frame after next since the initial allocation). In retransmission, the UE retransmits the data at $(N+26)^{th}$, $(N+34)^{th}$, $(N+35)^{th}$ and $(N+36)^{th}$ subframes, and the HARQ retransmission period is 22 ms. If the initial resource allocation is made at subframe 9, the retransmission period increases to 29 ms according to the above calculation procedure.

That is, when the number of subframes for TTI bundling is 4 as in the conventional method, if I value of the table is used in configuration 3, the UE is capable of operating two HARQ processes while using HARQ retransmission period of 22 or 29 ms.

If the TTI bundling is commanded to the UE through one of the above embodiments, the UE determines the data allocation timing and ACK/NACK transmission timing based on the given information at step 113 and transmits uplink data according to the command of the cell at step 115.

Figure 2:
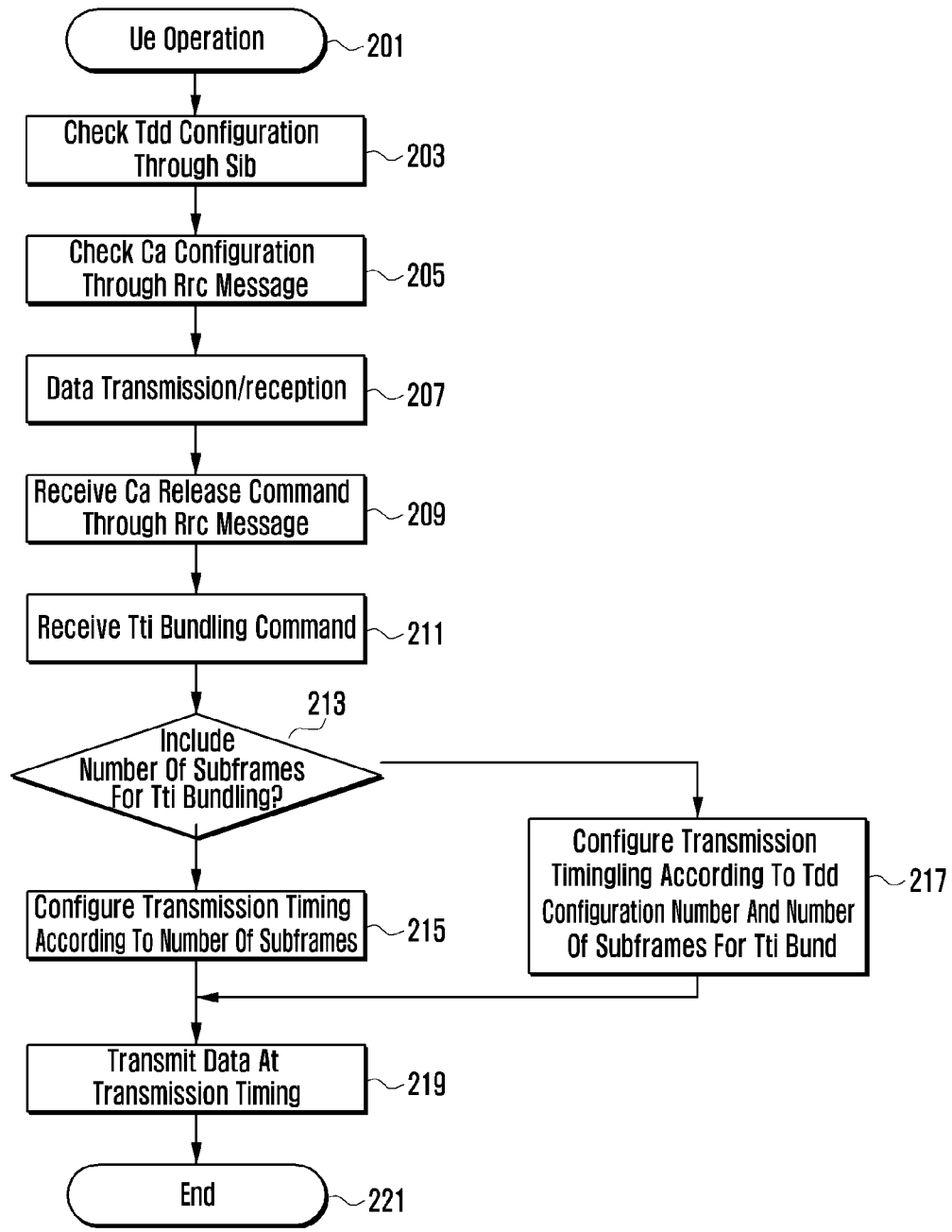
FIG. 2 is a flowchart illustrating an operation procedure of the UE according to an embodiment of the present invention.

FIG. 2 is a flowchart illustrating an operation procedure of the UE according to an embodiment of the present invention.

The UE checks the TDD configuration of the cell to locate the uplink and/or downlink position through System Information Block (SIB) at step 203. The UE and the cell may exchange RRC messages to configure CA selectively at step 205.

Next, the UE and the cell communicate data based on the configured values at step 207. If it is determined to configure TTI bundling to the UE, the UE receives the CA release command from the cell through an RRC message and releases CA at step 209. This is because the CA which aggregates multiple carriers to increase data rate increases data error occurrence rate at the cell edge UE.

Subsequently or simultaneously, the UE receives a command for TTI bundling, i.e. TTI bundling configuration command, from the cell at step 211. According to various embodiments described above, the UE may receive the TTI bundling command with or without information on the number of subframes for the TTI bundling.

If the TTI bundling configuration command message received from the cell includes the information on the number of subframes for TTI bundling at step 213, the UE configures data transmission timing and ACK/NACK reception timing according to the number of subframes at step 215. Otherwise if the information on the number of subframes for TTI bundling is not included, the UE configures the data transmission timing and ACK/NACK reception timing according to a predetermined number of subframes for bundling (value fixed regardless of or according to the configuration number) at step 217.

Afterward, the UE transmits/receives data according to the configured value at step 219.

Figure 3:
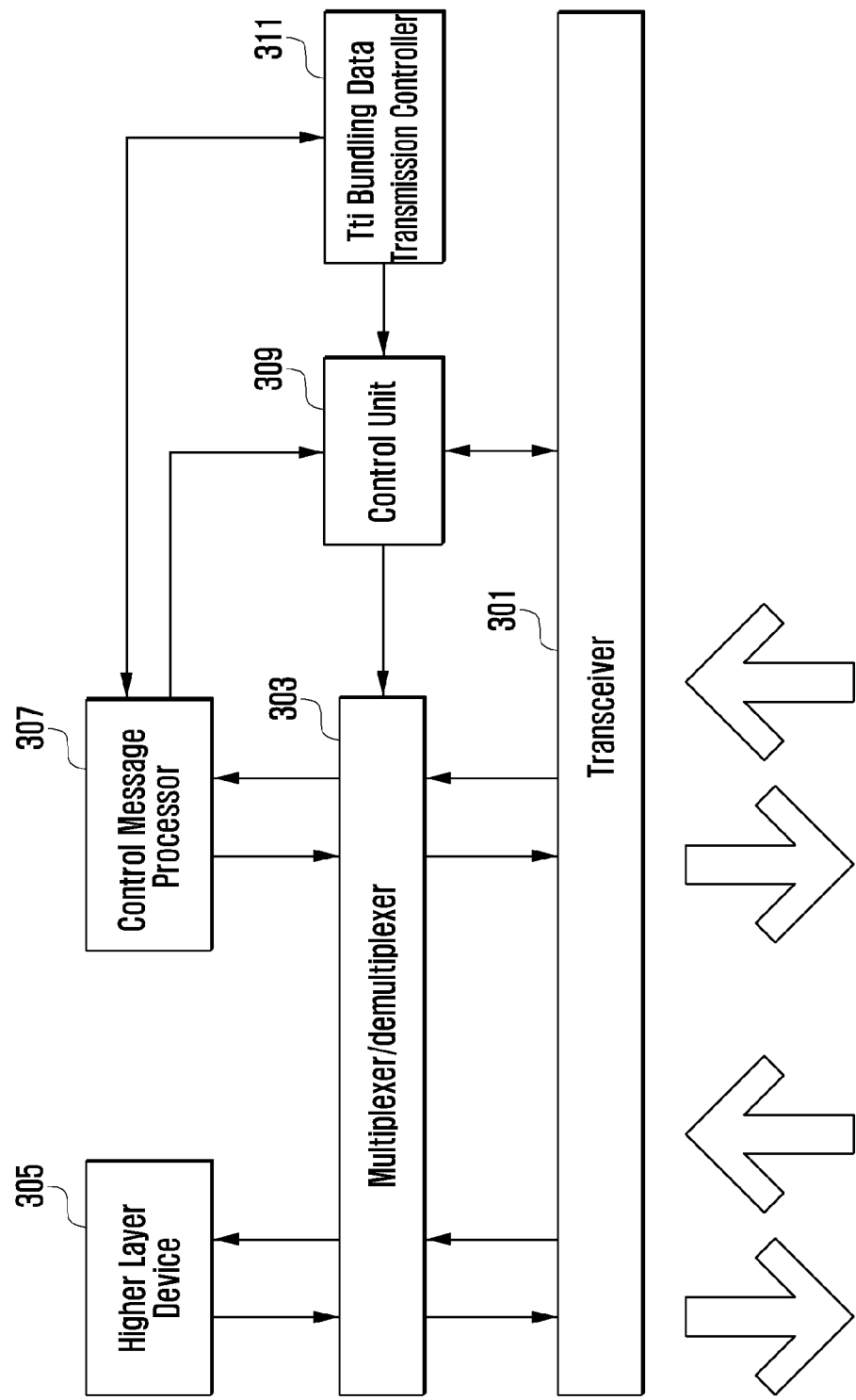
FIG. 3 is a block diagram illustrating a configuration of the UE according to an embodiment of the present invention.

FIG. 3 is a block diagram illustrating a configuration of the UE according to an embodiment of the present invention.

The UE transmits and receives data to and from higher layer 305, and the control message processor 307 transmits and receives control messages. In transmission, the UE multiplexes the control messages by means of the multiplexer/demultiplexer 303 and transmit the data by means of the transceiver 301 under the control of the control unit 309.

In reception, the UE receives a physical by means of the transceiver 310, demultiplexes the received signal by means of the multiplexer/demultiplexer 303, and delivers the message information to the higher layer 350 or the control message processor 307 under the control of the control unit 309.

According to an embodiment of the present invention, the control unit 309 checks information on whether to configure TTI bundling in the control message (in the present invention, SIB and RRC message information) and delivers the corresponding message or received value to the TTI bundling data transmission controller 311. The TTI bundling data transmission controller 311 configures the data transmission timing and ACK/NACK reception timing based on the resource allocation timing and notifies the control unit 309 of this for data communication.

Although the description is directed to the case where the control message processor 307, the control unit 309, and the TTI bundling data transmission controller 311 are shown as separate blocks responsible for certain functions, it is just for convenience purpose and not necessary for the blocks to be separated physically.

For example, the control unit 309 may control receiving the TTI bundling configuration command from the eNB, checking whether the TTI bundling configuration command includes the information on a number of subframes for TTI bundling, determining, when the information on the number of subframes is included, signal transmission timing according to the number of subframes for TTI bundling, and determining, when the information on the number of subframes is not included, signal transmission/reception timing according to the number of subframes for TTI bundling.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A method for transmitting and receiving a signal by a terminal in a wireless communication system employing a timing division duplexing (TDD), the method comprising:
    receiving transmission timing interval (TTI) bundling configuration information from a base station;
    checking whether the TTI bundling configuration information includes a number of uplink subframes for a TTI bundling;
    performing, if the number of uplink subframes for the TTI bundling is included in the TTI bundling configuration information, signal transmission and reception at a first timing determined based on the number of uplink subframes for the TTI bundling; and
    performing, if the number of uplink subframes for the TTI bundling is not included in the TTI bundling configuration information, signal transmission and reception at a second timing determined based on a predetermined number of uplink subframes for the TTI bundling and predetermined TDD subframe configuration information,
    wherein the number of uplink subframes for the TTI bundling is used when a TDD configuration number having two or three uplink subframes in a period is configured to the terminal.

2. The method of claim 1, wherein the predetermined number of uplink subframes for the TTI bundling is determined based on a number of uplink subframes which is fixed depending on the TDD configuration number.

3. The method of claim 1, wherein the predetermined number of uplink subframes for the TTI bundling is determined regardless of a number of uplink subframes which is fixed depending on the TDD configuration number.

4. The method of claim 1, wherein the receiving of the TTI bundling configuration information comprises performing, if the TTI bundling configuration information is received after carrier aggregation is configured to the terminal, an RRC connection reestablishment procedure.

5. The method of claim 1, wherein the receiving of the TTI bundling configuration information comprises receiving, if carrier aggregation is configured to the terminal, a carrier aggregation release command before the receipt of the TTI bundling configuration information.

6. A terminal transmitting and receiving signals in a wireless communication system employing a timing division duplexing (TDD), the terminal comprising:
    a transceiver; and
    a controller circuit coupled with the transceiver and configured to control to:
        receive transmission timing interval (TTI) bundling configuration information from a base station,
        check whether the TTI bundling configuration information includes a number of uplink subframes for a TTI bundling,
        perform, if the number of uplink subframes for the TTI bundling is included in the TTI bundling configuration information, signal transmission and reception at a first timing based on the number of uplink subframes for the TTI bundling, and
        perform, if the number of uplink subframes for the TTI bundling is not included in the TTI bundling configuration information, signal transmission and reception at a second timing based on a predetermined number of uplink subframes for the TTI bundling and predetermined TDD subframe configuration information,
    wherein the number of uplink subframes for the TTI bundling is used when a TDD configuration number having two or three uplink subframes in a period is configured to the terminal.

7. The terminal of claim 6, wherein the predetermined number of uplink subframes for the TTI bundling is determined based on a number of subframes which is fixed depending on the TDD configuration number.

8. The terminal of claim 6, wherein the predetermined number of uplink subframes for the TTI bundling is determined regardless of a number of subframes which is fixed depending on the TDD configuration number.

9. The terminal of claim 6, wherein the controller circuit is further configured to perform, if the TTI bundling configuration information is received after carrier aggregation is configured to the terminal, an RRC connection reestablishment procedure.

10. The terminal of claim 6, wherein the controller circuit is further configured to receive, if carrier aggregation is configured to the terminal, a carrier aggregation release command before the receipt of the TTI bundling configuration information.

* * * * *